United States Patent
Lee et al.

(10) Patent No.: US 9,261,585 B2
(45) Date of Patent: Feb. 16, 2016

(54) RADAR APPARATUS USING IMAGE CHANGE DETECTOR AND METHOD OF OPERATING THE SAME

(71) Applicant: Electronics and Telecommunications Research Institute, Daejeon (KR)

(72) Inventors: Mi-Young Lee, Daejeon (KR); Bon-Tae Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 267 days.

(21) Appl. No.: 14/079,001

(22) Filed: Nov. 13, 2013

(65) Prior Publication Data
US 2014/0240169 A1    Aug. 28, 2014

(30) Foreign Application Priority Data

Feb. 28, 2013  (KR) ........................ 10-2013-0021804

(51) Int. Cl.
 *G01S 7/292* (2006.01)
 *G01S 7/35* (2006.01)
 *G01S 7/40* (2006.01)

(52) U.S. Cl.
CPC .............. *G01S 7/354* (2013.01); *G01S 7/292* (2013.01); *G01S 7/4021* (2013.01)

(58) Field of Classification Search
CPC ........ G01S 7/354; G01S 7/292; G01S 7/4021
USPC .......................................... 342/159, 93, 195
See application file for complete search history.

(56) References Cited

U.S. PATENT DOCUMENTS

| | | | | |
|---|---|---|---|---|
| 5,644,315 A * | 7/1997 | Long | ................... | G01S 13/5246 342/101 |
| 5,798,728 A * | 8/1998 | Tomishima | ........... | G01S 7/2927 342/159 |
| 5,808,579 A * | 9/1998 | Rademacher | ........... | G01S 7/2927 342/159 |
| 7,307,575 B2 * | 12/2007 | Zemany | .................. | G01S 13/32 342/160 |

(Continued)

FOREIGN PATENT DOCUMENTS

| KR | 101035304 B1 | 5/2011 |
|---|---|---|
| KR | 101040315 B1 | 6/2011 |

OTHER PUBLICATIONS

Roberto Perez-Andrade et al., "A versatile hardware architecture for a constant false alarm rate processor based on a linear insertion sorter," Digital Signal Processing, 2010, pp. 1733-1747, vol. 20, Issue 6, Elsevier Inc.

*Primary Examiner* — John B Sotomayor
(74) *Attorney, Agent, or Firm* — William Park & Associates Ltd.

(57) ABSTRACT

Disclosed herein are a radar apparatus and a method of operating the same. The radar apparatus includes a clutter analysis unit, a screen change detection unit, a representative value acquisition unit, and a target detection unit. The clutter analysis unit analyzes the clutter value of a signal that is received by a reception unit. The screen change detection unit calculates the screen change time up to the time at which a screen has been changed from an image captured by an imaging apparatus. The representative value acquisition unit acquires a representative value based on a plurality of clutter values analyzed for the screen change time by the clutter analysis unit. The target detection unit determines the signal to be a target signal if the size of the signal is larger than both the clutter value and representative value of the signal.

6 Claims, 3 Drawing Sheets

(56) References Cited

U.S. PATENT DOCUMENTS

| | | | | |
|---|---|---|---|---|
| 2008/0169974 A1* | 7/2008 | Fujikawa | | G01S 13/106 342/179 |
| 2009/0015460 A1* | 1/2009 | Fox | | G01S 7/2922 342/53 |
| 2010/0111438 A1* | 5/2010 | Chang | | G06T 5/20 382/266 |
| 2010/0321234 A1* | 12/2010 | Goldman | | G01S 13/9029 342/25 A |
| 2011/0006944 A1* | 1/2011 | Goldman | | G01S 13/9029 342/25 A |
| 2011/0241931 A1* | 10/2011 | Krich | | G01S 13/582 342/159 |
| 2013/0076561 A1* | 3/2013 | Kubota | | G01S 7/062 342/179 |
| 2013/0169473 A1* | 7/2013 | Gallone | | G01S 7/354 342/159 |
| 2014/0240169 A1* | 8/2014 | Lee | | G01S 7/292 342/159 |

\* cited by examiner

RADAR APPARATUS USING IMAGE CHANGE DETECTOR AND METHOD OF OPERATING THE SAME

CROSS-REFERENCE TO RELATED APPLICATION

This application claims the benefit of Korean Patent Application No. 10-2013-0021804, filed on Feb. 28, 2013, which is hereby incorporated by reference in its entirety into this application.

BACKGROUND OF THE INVENTION

1. Technical Field

The present invention relates generally to a radar apparatus and a method of operating the radar apparatus and, more particularly, to a radar apparatus and a method of operating the radar apparatus that are capable of improving the accuracy of detection of a target using an image change detector.

2. Description of the Related Art

In a detection method using a radar, when a target is detected, the sizes of noise called "clutter" and reflected waves are important factors. That is, when a target is detected, there are cases where if the size of the clutter is larger than the size of a signal reflected from the target, it is difficult to detect a target because the signal from the target is mixed with clutter. For example, when a specific automobile on a road is set as a target, it is not easy to only detect a signal reflected from the specific automobile among various objects, for example, buildings and other automobiles.

Furthermore, in the case of an automobile radar, a road environment considerably varies over time. For example, there is a case where an automobile that has just entered a road in which buildings are densely located and there are a small number of traffic lanes. The road in which buildings are densely located and there are a small number of traffic lanes may exhibit significantly different clutter characteristics compared to an expressway in which buildings are sparsely located and there are a large number of traffic lanes. In this situation, the characteristics of the clutter component collection information of the radar should be completely changed.

Accordingly, if it is possible to determine the period for which clutter characteristics have been kept similar and to evaluate clutter values for a long period, the accuracy of detection of a target can be increased.

In connection with this, there is Korean Patent No. 1035304 entitled "Vehicle Radar Apparatus using Elevation Angle Direction Detection Array Antenna and Detection Method using Vehicle Radar Apparatus."

SUMMARY OF THE INVENTION

Accordingly, the present invention has been made keeping in mind the above problems occurring in the prior art, and an object of the present invention is to provide a radar apparatus and a method of operating the radar apparatus that are capable of increasing the accuracy of detecting of a target.

In accordance with an aspect of the present invention, there is provided a radar apparatus, including a clutter analysis unit configured to analyze the clutter value of a signal that is received by a reception unit; a screen change detection unit configured to calculate the screen change time up to the time at which a screen has been changed from an image captured by an imaging apparatus; a representative value acquisition unit configured to acquire a representative value based on a plurality of clutter values analyzed for the screen change time by the clutter analysis unit; and a target detection unit configured to determine the signal to be a target signal if the size of the signal is larger than both the clutter value and representative value of the signal.

The screen change detection unit may determine whether the screen has been changed using histogram analysis.

The clutter analysis unit may analyze the clutter value using a Constant False Alarm Rate (CFAR) detection technique, including Order Statistic (OS)-CFAR and Cell Averaging (CA)-CFAR.

In accordance with another aspect of the present invention, there is provided a method of operating a radar apparatus, including analyzing, by a clutter analysis unit, the clutter value of a signal that is received by a reception unit; calculating, by a screen change detection unit, the screen change time up to the time at which a screen has been changed from an image captured by an imaging apparatus; acquiring, by a representative value acquisition unit, a representative value based on a plurality of clutter values analyzed for the screen change time; and determining, by a target detection unit, the signal to be a target signal if the size of the signal is larger than both the clutter value and representative value of the signal.

Calculating the screen change time may include determining whether the screen has been changed using histogram analysis.

Analyzing the clutter value may include analyzing the clutter value using a CFAR detection technique, including OS-CFAR and CA-CFAR.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
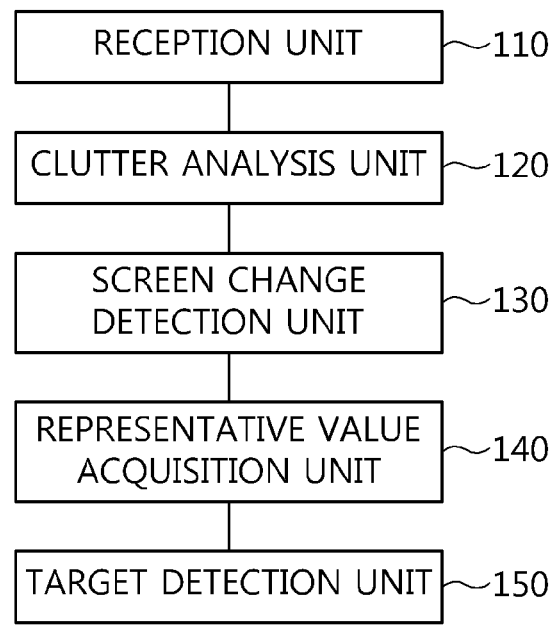
FIG. 1 is a block diagram illustrating a radar apparatus according to an embodiment of the present invention.

The present invention will be described in detail below with reference to the accompanying drawings. Repeated descriptions and descriptions of known functions and configurations which have been deemed to make the gist of the present invention unnecessarily vague will be omitted. The embodiments of the present invention are intended to fully describe the present invention to a person having ordinary knowledge in the art. Accordingly, the shapes, sizes, etc. of elements in the drawings may be exaggerated to make the description clear.

A radar apparatus 100 according to an embodiment of the present invention will be described with reference to FIG. 1.

FIG. 1 is a block diagram illustrating the radar apparatus 100 according to this embodiment of the present invention. As illustrated in FIG. 1, the radar apparatus 100 according to this embodiment of the present invention includes a reception unit 110, a clutter analysis unit 120, a screen change detection unit 130, a representative value acquisition unit 140, and a target detection unit 150. The elements included in the radar apparatus 100 will be described below.

The clutter analysis unit 120 functions to analyze a clutter value received by the reception unit 110. That is, the clutter analysis unit 120 analyzes a clutter value using signals proximate to a signal that is received by the reception unit 110. In greater detail, the clutter analysis unit 120 analyzes a clutter value using a preset number of signals before and after a signal that is received by the reception unit 110. In this case, a Constant False Alarm Rate (CFAR) detection technique, including Order Statistic (OS)-CFAR and Cell Averaging (CA)-CFAR, may be used as an algorithm that is used for the analysis. In this case, the algorithm that is used for the analysis is not limited thereto, but may be replaced with any existing or future algorithm that can be easily used to analyze a clutter value.

The screen change detection unit 130 functions to calculate the screen change time up to the time at which a screen has been changed from an image captured by an imaging apparatus. That is, the screen change detection unit 130 measures the time for which clutter characteristics have not changed. In this case, when it is determined whether the screen has been changed, histogram analysis is used. In this case, the algorithm that is used to determine whether the screen has been changed is not limited thereto, and may be replaced with any existing or future algorithm that can easily determine whether the screen has been changed.

The representative value acquisition unit 140 functions to acquire a representative value based on a plurality of clutter values that are analyzed by the clutter analysis unit 120 for the screen change time that is calculated by the screen change detection unit 130. That is, the representative value acquisition unit 140 continuously collects a plurality of clutter values that are analyzed by the clutter analysis unit 120 for the screen change time. The representative value is acquired using the plurality of collected clutter values. In this case, when acquiring the representative value, the representative value acquisition unit 140 may use various algorithms, including an algorithm using an average value and an algorithm using an intermediate value.

The target detection unit 150 functions to determine a signal to be a target signal if the size of the signal is larger than both the clutter value and representative value of the signal. That is, the target detection unit 150 determines a signal to be a target signal only when the size of the signal is larger than both a clutter value analyzed by the clutter analysis unit 120 and a representative value acquired by the representative value acquisition unit 140. That is, when the size of the signal is smaller than at least one of the clutter value and the representative value, the signal is not determined to be a target signal. This can increase the accuracy of the detection of a target.

Figure 2:
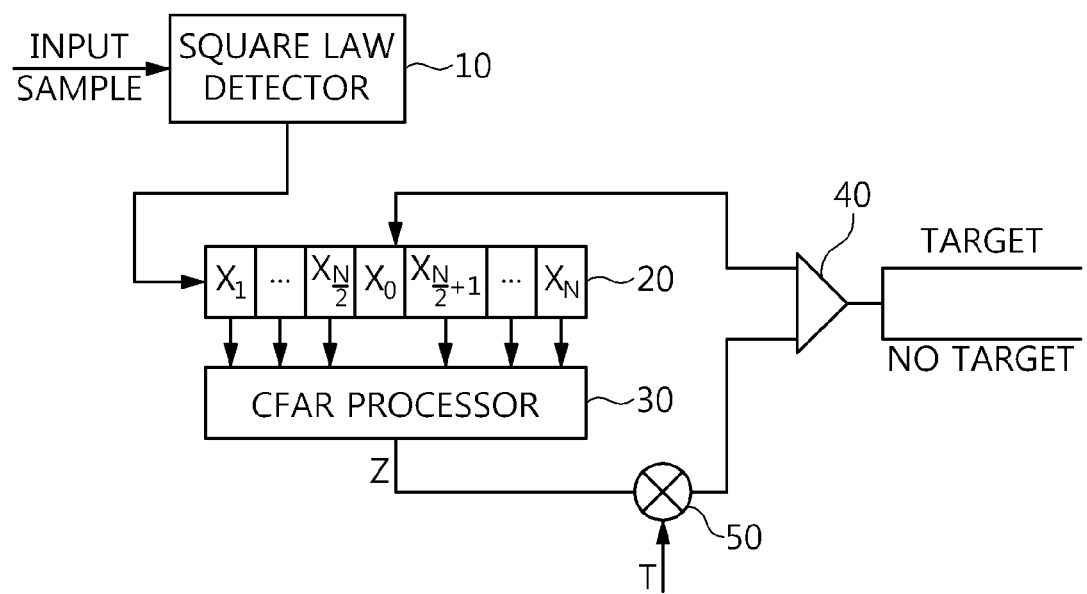
FIG. 2 is a diagram illustrating a process in which a clutter analysis unit included in the radar apparatus according to the embodiment of the present invention operates.

An example in which the clutter analysis unit 120 acquires a clutter value will be described with reference to FIG. 2. FIG. 2 is a diagram illustrating a process in which the clutter analysis unit 120 operates.

In FIG. 2, among signal blocks 20, $X_0$ refers to a current signal. A clutter value is analyzed based on signals before and after $X_0$, that is, N signals. This is analyzed via a clutter processor 30. That is, a Z value that is output by the CFAR processor 30 is a clutter value.

Furthermore, representative methods by which the CFAR processor 30 analyzes a clutter value are the above-described two methods. That is, the representative clutter value analysis method includes a CA-CFAR technique that takes the average value of N signals and then calculates a clutter value and an OS-CFAR technique that arranges N signals in order of size and then uses a signal corresponding to a k-th signal as a clutter value. As described above, the clutter analysis methods are not limited thereto, but any method that can analyze a clutter value may be used.

Figure 3:
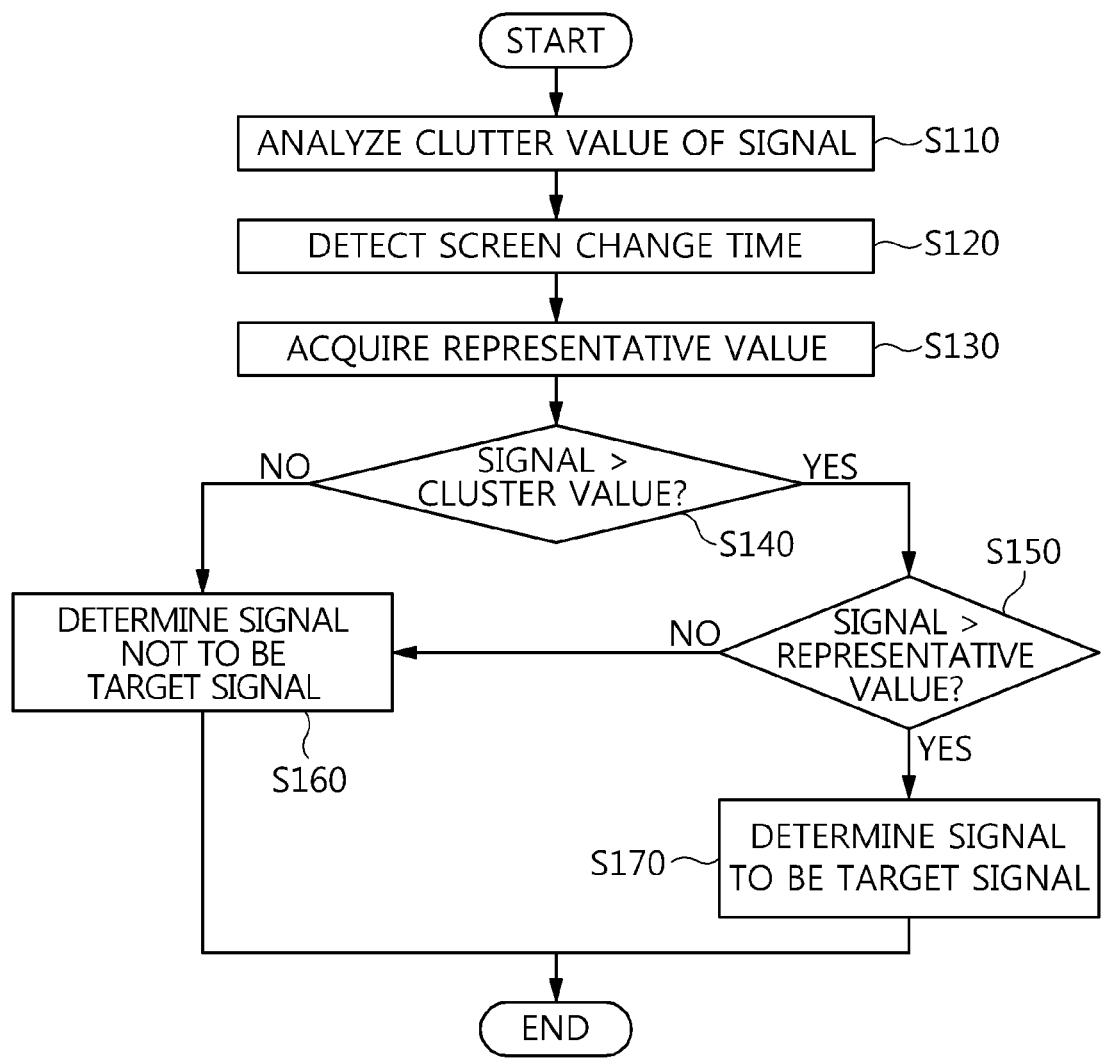
FIG. 3 is a flowchart illustrating a method of operating a radar apparatus according to an embodiment of the present invention.

A method of operating a radar apparatus according to an embodiment of the present invention will be described with reference to FIG. 3. FIG. 3 is a flowchart illustrating the method of operating a radar apparatus according to the embodiment of the present invention.

First, step S110 at which the clutter analysis unit analyzes the clutter value of a signal that is received by the reception unit. As described with reference to FIG. 1, the clutter value is analyzed using signals proximate to the signal received by the reception unit, that is, a preset number of signals before and after the received signal. An algorithm that is used for the analysis may be a CFAR detection technique, such as an OS-CFAR or a CA-CFAR. As described above, it should be appreciated that the algorithm is not limited thereto.

Thereafter, step S120 at which the screen change detection unit calculates the screen change time up to the time at which a screen is changed from an image that is captured by an imaging apparatus is performed. That is, at step S120, the time for which clutter characteristics has not changed may be measured and then used to assist in the following analysis of clutter. When it is determined at step S120 whether the screen has been changed, histogram analysis is used. Furthermore, it should be appreciated that the determination method is not limited thereto.

Thereafter, step S130 at which the representative value acquisition unit acquires a representative value based on a plurality of clutter values that have been analyzed at the step of analyzing the plurality of clutter values for the screen change time is performed. At step S130, the plurality of clutter values analyzed for the screen change time at step S110 is collected, and then a representative value is acquired using the plurality of collected clutter values. In this case, various algorithms, including an algorithm using an average value and an algorithm using an intermediate value, may be used as a method of acquiring a representative value.

Thereafter, step S140 at which the target detection unit compares the size of the signal with the clutter value is performed. In this case, if the size of the signal is larger than the clutter value, the control proceeds to step S150. Otherwise the control proceeds to step S160.

At step S150, if it is determined at step S140 that the size of the signal is larger than the clutter value, the size of the signal is compared with the representative value. In this case, if the size of the signal is larger than the representative value, the control proceeds to step S170. Otherwise, the control proceeds to step S160.

Step S160 is a step that is performed if the size of the signal is smaller than at least one of the clutter value and the representative value. At step S160, it is determined that the signal is not a target signal. Thereafter, the control proceeds to an end block.

Step S170 is a step that is performed if the size of the signal is larger than both the clutter value and the representative value. At step S170, it is determined that the signal is a target signal. Thereafter, the control proceeds to an end block.

The radar apparatus and the method of operating the radar apparatus have the advantage of increasing the accuracy of detecting of a target by taking into account the time for which clutter characteristics have not considerably changed in an image that is captured by an imaging apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A radar apparatus, comprising:
   a clutter analysis unit configured to analyze a clutter value of a signal that is received by a reception unit;
   a screen change detection unit configured to calculate a screen change time up to a time at which a screen has been changed from an image captured by an imaging apparatus;
   a representative value acquisition unit configured to acquire a representative value based on a plurality of clutter values analyzed for the screen change time by the clutter analysis unit; and
   a target detection unit configured to determine the signal to be a target signal if a size of the signal is larger than both the clutter value and representative value of the signal.

2. The radar apparatus of claim 1, wherein the screen change detection unit determines whether the screen has been changed using histogram analysis.

3. The radar apparatus of claim 1, wherein the clutter analysis unit analyzes the clutter value using a Constant False Alarm Rate (CFAR) detection technique, including Order Statistic (OS)-CFAR and Cell Averaging (CA)-CFAR.

4. A method of operating a radar apparatus, comprising:
   analyzing, by a clutter analysis unit, a clutter value of a signal that is received by a reception unit;
   calculating, by a screen change detection unit, a screen change time up to a time at which a screen has been changed from an image captured by an imaging apparatus;
   acquiring, by a representative value acquisition unit, a representative value based on a plurality of clutter values analyzed for the screen change time; and
   determining, by a target detection unit, the signal to be a target signal if a size of the signal is larger than both the clutter value and representative value of the signal.

5. The method of claim 4, wherein calculating the screen change time comprises determining whether the screen has been changed using histogram analysis.

6. The method of claim 4, wherein analyzing the clutter value comprises analyzing the clutter value using a CFAR detection technique, including OS-CFAR and CA-CFAR.

* * * * *